US007969345B2

(12) United States Patent
Abatzoglou et al.

(10) Patent No.: US 7,969,345 B2
(45) Date of Patent: Jun. 28, 2011

(54) FAST IMPLEMENTATION OF A MAXIMUM LIKELIHOOD ALGORITHM FOR THE ESTIMATION OF TARGET MOTION PARAMETERS

(75) Inventors: Theagenis J. Abatzoglou, Huntington Beach, CA (US); Johan Enmanuel Gonzalez, El Segundo, CA (US)

(73) Assignee: Raytheon Company, Waltham, MA (US)

( * ) Notice: Subject to any disclaimer, the term of this patent is extended or adjusted under 35 U.S.C. 154(b) by 218 days.

(21) Appl. No.: 12/422,878

(22) Filed: Apr. 13, 2009

(65) Prior Publication Data

US 2010/0259442 A1 Oct. 14, 2010

(51) Int. Cl.
*G01S 13/00* (2006.01)
(52) U.S. Cl. .................................... 342/25 R
(58) Field of Classification Search ............... 342/25
See application file for complete search history.

(56) References Cited

U.S. PATENT DOCUMENTS

| 7,397,418 B1 * | 7/2008 | Doerry et al. | 342/25 R |
| 7,626,536 B1 * | 12/2009 | Rihaczek et al. | 342/96 |
| 2005/0280571 A1 * | 12/2005 | Abatzoglou et al. | 342/25 B |

OTHER PUBLICATIONS

P. Bello, "Joint Estimation of Delay, Doppler, and Doppler Rate", *IRE Transactions on Information Theory*, IT-6, 3 (Jun. 1960), pp. 330-341.
E.J. Kelley, "The Radar Measurement of Range, Velocity and Acceleration", *IRE Transactions on Military Electronics*, MIL-5 (Apr. 1961), pp. 51-57.

T.J. Abatzoglou, "A Fast Maximum Likelihood Algorithm for Frequency Estimation of a Sinusoid Based on Newton's Method", *IEEE Transactions on Acoustics, Speech, and Signal Processing*, vol. ASSP-33, No. 1, Feb. 1985, pp. 77-89.
T.J. Abatzoglou, "Fast Maximum Likelihood Joint Estimation of Frequency and Frequency Rate", *IEEE Transactions Aerospace and Electronic Systems*, vol. AES-22, No. 6, Nov. 1986, pp. 1409-1412.
T.J. Abatzoglou et al., "Range, Radial Velocity, and Acceleration MLE Using Radar LFM Pulse Train", *IEEE Transactions Aerospace and Electronic Systems*, vol. AES-34, No. 4, Oct. 1998, pp. 1070-1084.
J. Aldrich, "R.A. Fisher and the Making of Maximum Likelihood 1912-1922", *Statistical Science*, vol. 12 No. 3, pp. 162-176.
T. Sauer and A. Schroth, "Robust Range Alignment Algorithm via Hough Transform in an ISAR Imaging System", *IEEE Transactions Aerospace and Electronic Systems*, 31 (1995), pp. 1173-1177.
R.C. DiPietro, R.L. Fante, and R.P. Perry, "Space-Based Bistatic GMTI Using Low Resolution SAR", Aerospace Conference, 1997, Proceedings., IEEE vol. 2, Feb. 1-8, 1997 pp. 181-193.
R.P. Perry, R.C. DiPietro, and R.L. Fante, "SAR Imaging of Moving Targets", *IEEE Transactions on Aerospace and Electronic Systems*, vol. AES-35, No. 1 Jan. 1999, pp. 188-200.

* cited by examiner

*Primary Examiner* — Thomas H Tarcza
*Assistant Examiner* — Timothy A Brainard
(74) *Attorney, Agent, or Firm* — Christie, Parker & Hale, LLP

(57) ABSTRACT

A system and method for implementing a maximum likelihood estimator for making a joint estimation of range, range rate, and acceleration of a target utilizing a pulse doppler radar. The MLE of target motion parameters are determined by keystone processing a baseband signal, and generating a first estimate of the motion parameters based on the processed signal. The first estimate is utilized to set up sampling intervals for the performance of a coarse search. Then a fine search is performed using Newton's method to determine the MLE.

13 Claims, 6 Drawing Sheets

Fig. 2
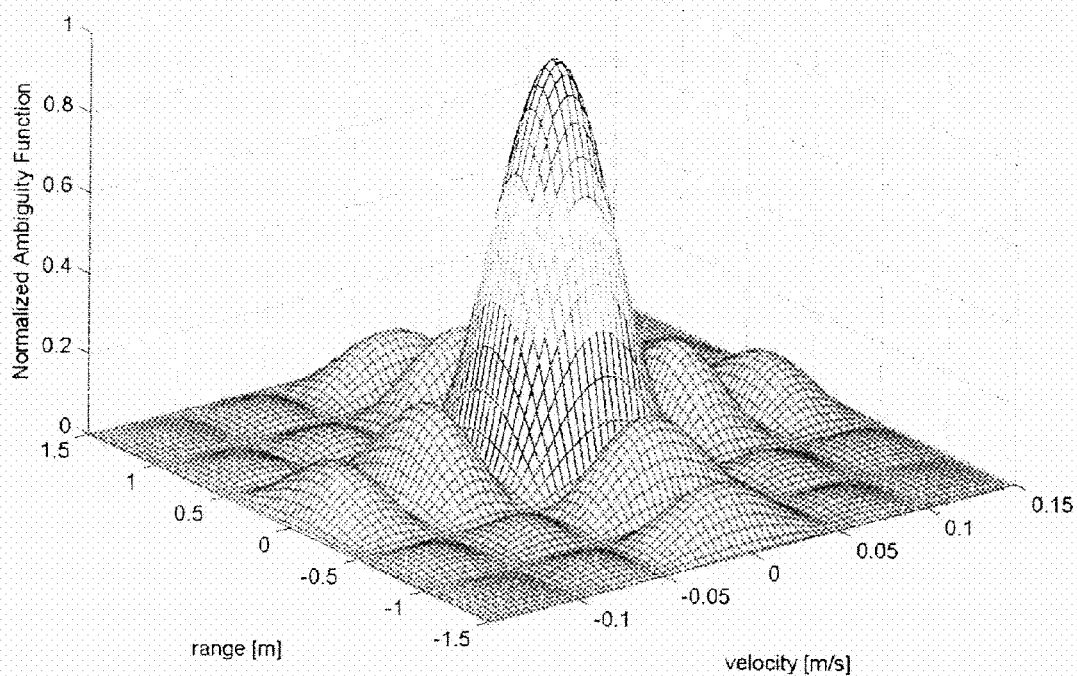
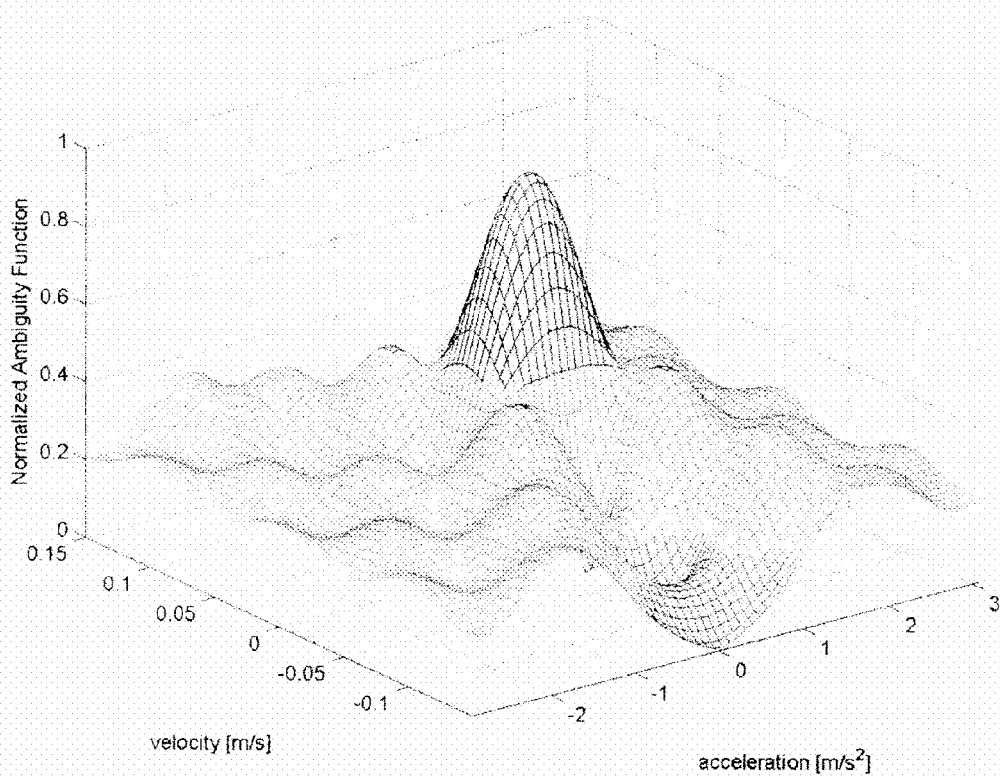

Fig. 7
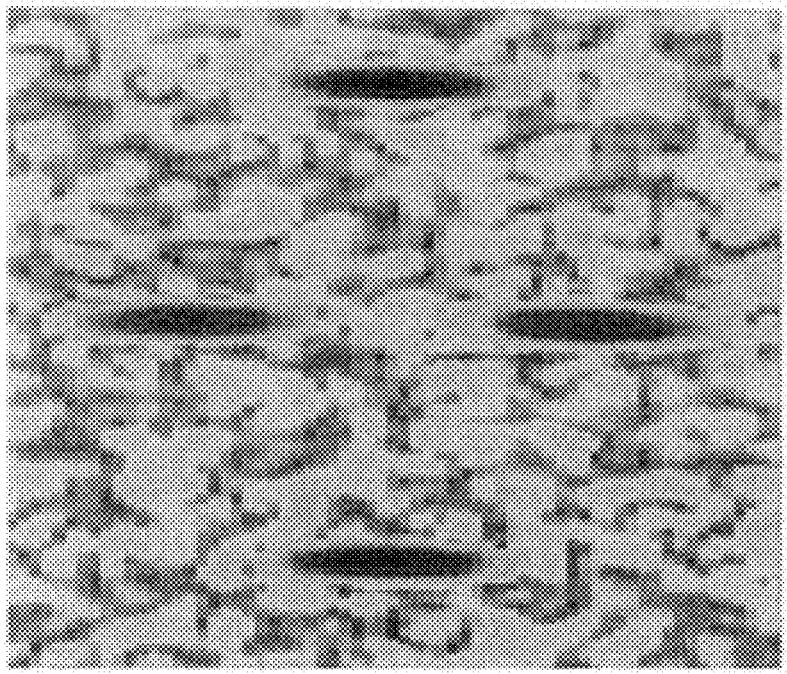
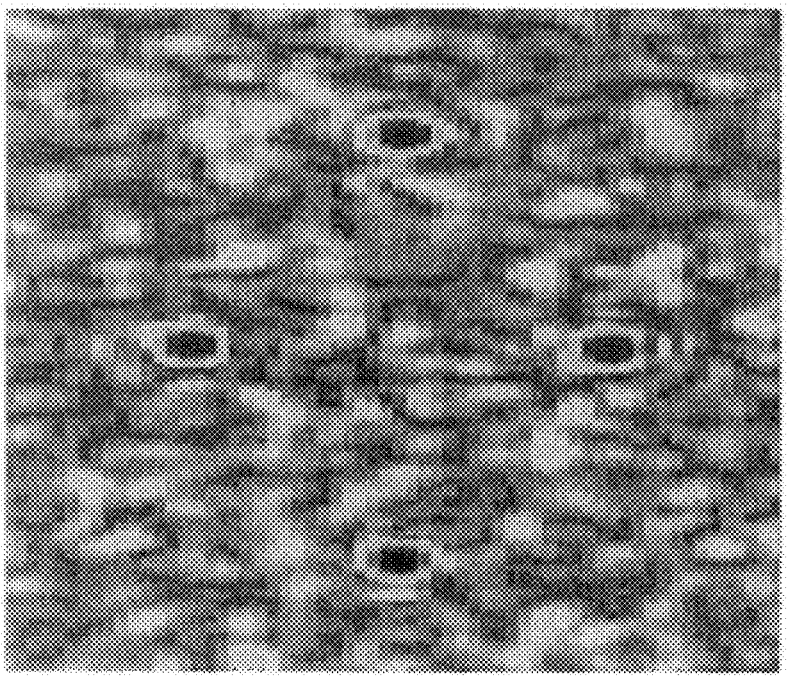

FAST IMPLEMENTATION OF A MAXIMUM LIKELIHOOD ALGORITHM FOR THE ESTIMATION OF TARGET MOTION PARAMETERS

STATEMENT REGARDING FEDERALLY SPONSORED RESEARCH OR DEVELOPMENT

The U.S. Government has a paid-up license in this invention and the right in limited circumstances to require the patent owner to license others on reasonable terms as provided for by the terms of Contract No. F33615-02-D-1116-0007 awarded by the Air Force Research Laboratory.

BACKGROUND OF THE INVENTION

The present invention is generally related to signal processing for a radar system for motion compensation and target focusing.

The fast and accurate estimation of target range, range rate (i.e., radial velocity), and acceleration from sampled radar return signals is necessary for some radar applications. Joint estimation of these target motion parameters is an important precursor to motion compensation for high resolution spectral analysis of targets and synthetic aperture radar (SAR) or inverse synthetic aperture radar (ISAR) processing. The joint estimation of target motion parameters is also applicable in orbit determination of high altitude satellites, which typically require integration over long pulse trains for reliable detection and position measurement.

Many conventional radar systems attempt to accurately and expeditiously estimate target motion parameters. Some techniques used by conventional systems include the maximum entropy technique, the phase-gradient autofocus technique, and the phase difference autofocus technique, among others.

Maximum likelihood estimation (MLE) is a popular statistical method used to calculate the best way of fitting a mathematical model to some data. Modeling real data by estimating a maximum likelihood offers a way of tuning the free parameters of a model to provide an optimum fit.

Thus, some conventional systems have utilized the MLE technique for the determination of target motion parameters. The MLE in this case reduces to finding the maximum of a nonlinear 3-dimensional (3D) likelihood function. The range-velocity projection of the likelihood function behaves like an ambiguity function with a mainlobe accompanied by surrounding sidelobes that introduce many local maxima. The extent of the mainlobe is given by the radar range and velocity resolution formulas, known to those skilled in the art.

The conventional range and velocity resolution formulas, assuming no coupling between range and velocity estimation, are respectively given by $c/(2BW)$ and $(\lambda/2)/T_{DWELL}$, where c is the speed of light, BW is the bandwidth of the radar, $\lambda$ is the wavelength at RF, and $T_{DWELL}$ is the dwell duration. Because of the small area $c/(2BW)$ by $(\lambda/2)/T_{DWELL}$ of the mainlobe and the abundance of local optima, searching for the global maximum of the 3D function typically requires an exceedingly large number of computations.

Previous efforts to reduce the number of required computations for the MLE technique generally include the calculation of a priori bounds on the mean square error for the MLE of motion parameters or by non-coherent methods that initialize the MLE. However, these efforts have resulted in limited success. As such, prior attempts to improve the estimation of target motion parameters suffer from one or more of the following: prohibitively large numbers of computations, limited robustness, and limited accuracy.

For further background material, see Theagenis J. Abatzoglou and Gregory O. Gheen, *Range, Radial Velocity, and Acceleration MLE using Radar LFM Pulse Train*, IEEE TRANSACTIONS ON AEROSPACE AND ELECTRONIC SYSTEMS, Vol. 34, No. 4, October 1998, incorporated herein by reference in its entirety.

SUMMARY

The present invention provides a fast implementation of a maximum likelihood estimate (MLE) for making a joint estimation of range, radial velocity, and acceleration of a target using a pulse doppler radar. In summary, the MLE algorithm according to an exemplary embodiment of the present invention matches the real phase of a received signal with a model phase by optimizing their correlation over fast time and slow time coherently. This enables the MLE algorithm more accurately to estimate target motion parameters in low signal-to-noise ratio (SNR) conditions where other algorithms are defeated. The MLE algorithm discussed herein is based on a rigorous mathematical formulation, with applications including air-to-ground, air-to-air, and ground-to-air radar.

In one aspect, the invention enables the improved performance of conventional radar systems by increasing the range and making detections more robust and accurate.

In another aspect, the invention substantially compensates for or reduces quadratic range migration.

In another aspect, the invention provides for a reduced number of computations in calculating the MLE.

In another aspect, the invention provides improved detection sensitivity and accuracy in any number of tactical scenarios, including targets moving in a linear trajectory and maneuvering targets having a fast aspect angle change.

Various embodiments of the algorithm as a whole maintain coherence from end to end, thus avoiding subdwell processing and post-detection integration (PDI). An autofocus aspect of the invention is utilized to account for linear and quadratic range migration; Keystone processing is utilized to account for linear range migration; a coarse search is performed in range, doppler, and doppler rate; and a fine search is performed over the parameter space. The algorithm can be applied to an arbitrary pulse train waveform.

These and other aspects of the invention are more fully comprehended upon review of this disclosure.

BRIEF DESCRIPTION OF THE DRAWINGS

The accompanying drawings, together with the specification, illustrate exemplary embodiments of the present invention, and, together with the description, serve to explain the principles of the present invention.

FIG. 2 is an ambiguity function $\Psi$ representing a correlation between a real phase and a model phase;

FIG. 7 is an ISAR image of the simulated target of FIG. 6; and

DETAILED DESCRIPTION

Figure 1:
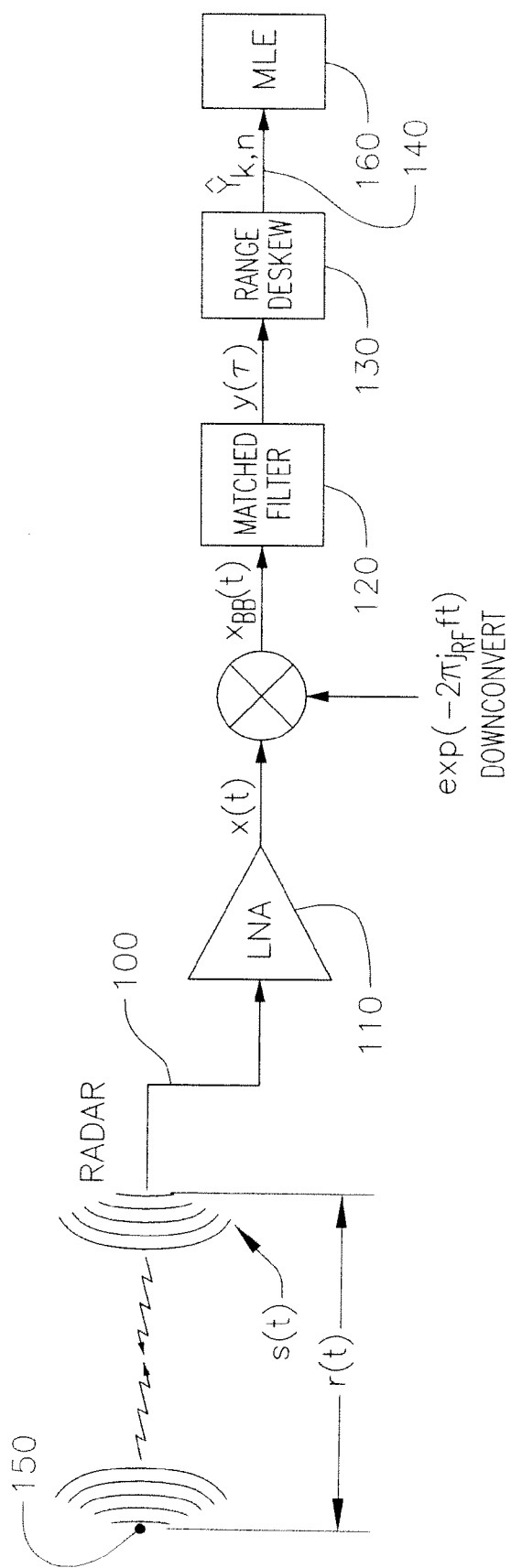
FIG. 1 is a block diagram illustrating a radar return signal preprocessing system utilized by an exemplary embodiment of the present invention.

In the following detailed description, only certain exemplary embodiments of the present invention are shown and described, by way of illustration. As those skilled in the art would recognize, the invention may be embodied in many different forms and should not be construed as being limited to the embodiments set forth herein. Like reference numerals designate like elements throughout the specification.

In an exemplary embodiment of the invention, a pulse doppler radar transmits a signal and receives a return signal reflected from a scatterer, or a target. The phase of the return signal (the "real phase") is correlated with the phase of a model signal (e.g., a signal generated by a matched filter), and due to doppler shifts in the return signal, the result of the correlation results in an ambiguity function Ψ of three dimensions, representing target motion parameters (i.e., range, range rate, and acceleration). The maximum value of the ambiguity function Ψ is then calculated in the three dimensions where the maximum values correspond to the maximum likelihood estimate of the target motion parameters. Because the ambiguity function is highly localized, the calculation of the maximum values includes three primary steps (keystone processing, coarse search, and fine search), with improved knowledge of the location of the maximum value of the ambiguity function in parameter space. First, a baseband signal, which is a preprocessed radar return signal, is subjected to keystone processing, discussed below, to improve the focus of the image by reducing "range migration." The maximum values of the ambiguity function are then found using conventional techniques. Next, using these maximum values as starting points, a "coarse search" of the ambiguity function Ψ over a higher resolution is performed, where the resolution of the search (sampling grid) is small enough to ensure the convergence of a "fine search," which is the third and final step. The coarse sampling grid is set up to search over a window centered at the first estimates determined after keystone processing, over a suitable span to ensure that the maximum is within the search window. Using the results of the coarse search as initial conditions, the fine search consists of utilizing Newton's method to calculate the maximum for each target motion parameter. Each of these steps is laid out in further detail below.

Radar targets are frequently modeled by the superposition of point scatterers over a small viewing angle and a moderate frequency band surrounding the RF. As is known to those skilled in the art, the maximum likelihood estimate (MLE) method for estimating target motion parameters (e.g., range, radial velocity, and radial acceleration), is improved when the target has a dominant scatterer or one of its dominant scatterers can be isolated from the others, e.g., when the isolated dominant scatterer is in a separate range-doppler resolution cell. The dominant scatterer returns are then processed by the MLE to obtain values for range, radial velocity, and acceleration. Motion compensation is attained by adjusting the phase of all returns relative to the phase derived from the isolated dominant scatterer. If there are several dominant scatterers the MLE yields something akin to tracking the centroid of their positions weighted by their radar cross section.

One aspect of an exemplary embodiment of the present invention is the enablement of a radar system to estimate target motion parameters quickly and accurately. That is, a system according to the exemplary embodiment employs a fast MLE-based algorithm whose root mean square error (RMSE) approaches the square root of the Cramer-Rao bound (CRB) for the target motion parameters.

A radar waveform utilized by one exemplary embodiment is a linear FM (LFM) pulse train. In the disclosure that follows, analytic properties of the associated ambiguity function are discussed; in particular, the convexity and symmetry properties of the ambiguity function are used to determine the region of convergence for recursive algorithms that compute the MLE. Keystone formatting initializes the MLE, followed by a coarse search and a fine search with the Newton method.

An implementation of an MLE algorithm as in this exemplary embodiment improves accuracy, robustness, and speed. The MLE yields estimates of the target motion parameters that approach the square root of the CRB. Because it is coherent, algorithm initialization with Keystone formatting improves detection sensitivity regardless of tactical scenario, i.e., targets moving in a linear trajectory or maneuvering.

Further aspects of some embodiments of the present invention include stability in conditions of low signal-to-noise ratio (SNR); the handling of quadratic range migration, which is an effect that can defeat other algorithms; and a relatively low computational load. In particular, initialization of the algorithm with Keystone formatting substantially reduces the computational load of the coarse and fine search components, thereby making the algorithm viable for system implementation.

Radar returns are baseband signals output from a radar system after preprocessing. Preprocessing conventionally is executed by a system including amplification, filtering, and other signal processing as is known to those skilled in the art, resulting in a baseband signal.

In the discussion that follows, the equation modeling the radar returns 140 from a point scatterer 150 is developed assuming a large bandwidth LFM waveform with a certain inter-pulse period (IPP). These analytical formulations are described with reference to the simplified block diagram of FIG. 1, which illustrates some components of a preprocessing system utilized by some embodiments of the present invention. The resulting output is a model of the radar returns from a point scatterer, which, as described below, is used for the determination of the target motion parameters of the real target.

In FIG. 1, the return signal 100 is passed through an LNA 10 and then downconverted. The baseband signal is then passed through a matched filter 120, which is followed by a Fourier transform at the output of the matched filter 120. Finally, spectral equalization is achieved by factoring out the magnitude square of the Fourier transform of the transmitted pulse, $|S(f)|^2$. The latter is akin to range deskew of the signal, as illustrated in block 130. Finally, the radar return 140 is passed to the MLE block 160 for extraction of the target motion parameters.

The complex envelope s(t) of the transmitted pulse is given by $$s(t)=p(t)e^{j\pi\gamma t^2}, \quad (1)$$

where p(t) is the pulse shape, and may be approximated by a rectangular or Gaussian pulse. p(t) is assumed to be 0 outside $|t|>T/2$, where T is the pulse duration. γ is the chirp slope. The phase variations in the return signal are due to changes from pulse to pulse in the range between scatterer and radar. The received signal x(t) at the output of a low noise amplifier (LNA) is $$x(t) = zs\left(t - \frac{2r(t)}{c}\right)e^{2\pi j f_{RF}\left(t - \frac{2r(t)}{c}\right)} + u(t), \quad (2)$$

where r(t) is the distance between the radar and the scatterer when the transmitted wavefront reaches the scatterer; u(t) is additive Gaussian noise; $f_{RF}$ is the center (carrier) frequency of the transmitted waveform; c is the speed of light; and z is the complex amplitude response of the scatterer. z is treated as a deterministic unknown. After downconverting to remove the carrier from the received signal, the baseband signal can be written as $$x_{BB}(t) = zs\left(t - \frac{2r(t)}{c}\right)e^{\frac{-2\pi j f_{RF} 2r(t)}{c}} + \tilde{u}(t), \quad (3)$$

where ũ is the noise at baseband. Next, the signal is processed by a matched filter 120 to isolate scatterers in range $$y(\tau) = \int x_{BB}(t)s^*(t-\tau)dt, \quad (4)$$

where τ is an estimate of the round trip delay from the target.

Under the assumption that the exponential term $$e^{\frac{-2\pi j f_{RF} 2r(t)}{c}}$$

does not change significantly over the pulse duration (i.e., the pulse duration is much less than the IPP and the target doppler frequency is known within 1/IPP), the matched filter output for the $n^{th}$ pulse can be approximated by $$y(\tau) \approx ze^{-j2\pi f_{RF}\tau_n} \int_{t_n-T/2}^{t_n+T/2} s(t-\tau_n)s^*(t-\tau) dt + \tilde{u}(\tau), \quad (5)$$

where $\tau_n = 2\left(\frac{r(t_n)}{c}\right)$ and $$\tilde{u}(\tau) = \int \tilde{u}(t)s^*(t-\tau)dt, \quad (6)$$

and $t_n$ is the time when the $n^{th}$ pulse is transmitted.

To account for significant range migrations from pulse to pulse, the Fourier transform is taken at the output of the matched filter to change to the frequency domain. This avoids the need to interpolate to account for subpixel motion and allows the magnitude square of the Fourier transform to be factored out of the transmitted pulse. This results in the following:

$$Y(f) = \int y(t)e^{-j2\pi f\tau}d\tau \quad (7)$$

$$= ze^{-j2\pi f_{RF}\tau_n} \int \int_{t_n-T/2}^{t_n+T/2} s(t-\tau_n)s^*(t-\tau)dt \times$$

$$e^{-j2\pi f t}dt + \int \tilde{u}(\tau)e^{-j2\pi f\tau}d\tau$$

-continued $$= ze^{-j2\pi f_{RF}\tau_n} \int_{\tau_n-T/2}^{\tau_n+T/2} s(t-\tau_n) \times \left(\int s^*(t-\tau)e^{-j2\pi f\tau}d\tau\right)dt +$$

$$\tilde{U}(f)$$

$$= ze^{-j2\pi f_{RF}\tau_n} \int_{\tau_n-T/2}^{\tau_n+T/2} s(t-\tau_n) \times$$

$$\left(\int s^*(t-\tau)e^{-j2\pi f(\tau-t)}d\tau\right) \times e^{-j2\pi f t}dt + \tilde{U}(f)$$

$$= ze^{-j2\pi f_{RF}\tau_n} \int_{\tau_n-T/2}^{\tau_n+T/2} s(t-\tau_n) \times e^{-j2\pi f(t-\tau_n)}dt \times$$

$$\int s^*(t-\tau)e^{-j2\pi f(\tau-t)}d\tau \times e^{-j2\pi f\tau_n} + \tilde{U}(f)$$

$$= ze^{-j2\pi f_{RF}\tau_n}|S(f)|^2 e^{-j2\pi f\tau_n} + \tilde{U}(f),$$

where S(f) is the Fourier transform of s(t):

$$S(f) = \int_{-T/2}^{T/2} p(t)e^{j\pi\gamma t^2}e^{-j2\pi f t}dt. \quad (8)$$

$\tilde{U}(f)$ is the Fourier transform of $\tilde{u}(\tau)$.

S(f) is sampled over a frequency band over which S(f) is nearly constant, and the data samples are redefined as:

$$\hat{Y}_{k,n} = \frac{\hat{Y}(k\Delta f)}{|S(k\Delta f)|^2} \quad (9)$$

$$= ze^{-j2\pi f_{RF}\tau_n}e^{-j2\pi k\Delta f\tau_n} + \frac{\hat{U}(k\Delta f)}{|S(k\Delta f)|^2}$$

$$= ze^{-j2\pi f_{RF}\tau_n}e^{-j2\pi k\Delta f\tau_n} + \hat{U}_{k,n},$$

where $$\hat{U}_{k,n} = \frac{\tilde{U}(k\Delta f)}{|S(k\Delta f)|^2}. \quad (10)$$

In the frequency domain, as shown above in Equation (9), the model of the radar return 140 is given by $$\hat{Y}_{k,n} = ze^{-j2\pi f_{RF}\tau_n}e^{-j2\pi k\Delta f\tau_n} + \hat{U}_{k,n}, \quad (11)$$

where k is the range frequency index (in fast time) with k= −K, ..., 0, ..., K (creating a bandwidth of BW=(2K+1)·Δf centered at $f_{RF}$); Δf is the frequency step equal to γΔt, where Δt is the intra-pulse sampling interval; n is the azimuth index (pulse number) with n=−N, ..., 0, ..., N; here, an odd number of pulses/gates is used out of convenience and it does not affect the final result; and $\tau_n$ is the round trip target delay time for the nth pulse. It is assumed that the power spectra of the baseband receiver noise ũ(t) and transmitted signal s(t) do not vary much over the processed frequency band.

Motion is accounted for in Equation (11) by $\tau_n$, which can be written as $$\tau_n \approx \tau_0 + 2\frac{v_0}{c}nIPP + \frac{\alpha_0}{c}n^2 IPP^2, \quad (12)$$

where $$\frac{1}{2}c\tau_0,$$

$v_0$, and $\alpha_0$ are the range, radial velocity, and acceleration of the scatterer, respectively, at time t=0. Although these are unknown, they are assumed to be unambiguous relative to some known range, velocity, and acceleration. Equation (12) is expressed up to acceleration, but it can be generalized to include higher order terms such as acceleration rate (i.e., jerk).

Thus, the model radar return 140 that would theoretically result from the transmission of a radar signal s(t) and reflected from a point scatterer 150 utilizing a radar system as illustrated in FIG. 1 is expressed as in Equation (11) as $\hat{Y}_{k,n}$.

In the discussion that follows, it is assumed that the target (e.g., the point scatterer 150, or essentially any target) has at least one isolated dominant scatterer. As such, the range, radial velocity, and acceleration of this dominant scatterer are estimated.

In summary, the MLE algorithm according to an exemplary embodiment of the present invention matches the real phase with a model phase by optimizing their correlation over fast time and slow time coherently. That is, the real phase is the phase of the radar return data resulting from reflection by a real target, while the model phase is that of a mathematical model of the radar return, described above in Equation (11). The radar data can be modeled as in Equation (11), with the time delay $\hat{\tau}_n$ from the isolated dominant scatterer given by:

$$\hat{\tau}_n = \tau + 2\frac{v}{c}nIPP + \frac{\alpha}{c}n^2IPP^2. \qquad (13)$$

The corresponding log-likelihood function log Λ for the radar data can then be written as $$\log \Lambda\left(A, \theta, \frac{R}{c}, v, \alpha\right) = \frac{-\sum_{k,n}\left|\hat{Y}_{k,n} - Ae^{-j\left(\theta + 2\pi(f_{RF}+k\Delta f)\right)\hat{\tau}_n\left(\frac{R}{c},v,\alpha\right)}\right|^2}{\sigma^2}, \qquad (14)$$

where A and θ are associated with the complex scattering coefficient, $z=Ae^{j\theta}$; and $\sigma^2$ is the variance of the complex white Gaussian noise $\hat{U}_{k,n}$. Note that in this equation, the time delay τ is replaced by R/c, indicating their proportional relationship. That is, τ=2R/c. Thus, at this stage, the parameters of the problem are A, θ, R, v, and α. The MLE for these parameters is equivalent to minimizing the negative of the log-likelihood function. Because the complex scattering coefficient z enters linearly in the data, it can be solved in terms of the other parameters. Thus, substituting for z, the MLE reduces to:

$$\max_{\tau,v,\alpha}\left|\sum_{k,n}\hat{Y}_{k,n}e^{j2\pi f_{RF}\hat{\tau}_n(\tau,v,\alpha)}e^{j2\pi k\Delta f\hat{\tau}_n(\tau,v,\alpha)}\right|. \qquad (15)$$

Calculating these maxima results in $\hat{\tau}$, $\hat{v}$, and $\hat{\alpha}$, which represent the maximum likelihood estimates for the target motion parameters, that is, target range, target radial velocity, and target radial acceleration, respectively. In order to find the maximum likelihood estimates $\hat{\tau}$, $\hat{v}$, and $\hat{\alpha}$, a search is performed over parameter space. In order to carry out an expedient search over parameter space, the properties of the ambiguity function are examined.

The 3D ambiguity function for an LFM waveform has important characteristics, as follows. Let $\tau_0$, $v_0$, and $\alpha_0$ represent the unknown target motion parameters of the return signal contained in the $\hat{Y}_{k,n}$ radar return data. The MLE in the form of Equation (15) can be written as:

$$\max_{\tau,v,\alpha}\left|\sum e^{j2\pi f_{RF}\hat{\tau}_n(\tau-\tau_0,v-v_0,\alpha-\alpha_0)} \times e^{j2\pi k\Delta f\hat{\tau}_n(\tau-\tau_0,v-v_0,\alpha-\alpha_0)}\right|. \qquad (16)$$

Figure 3:
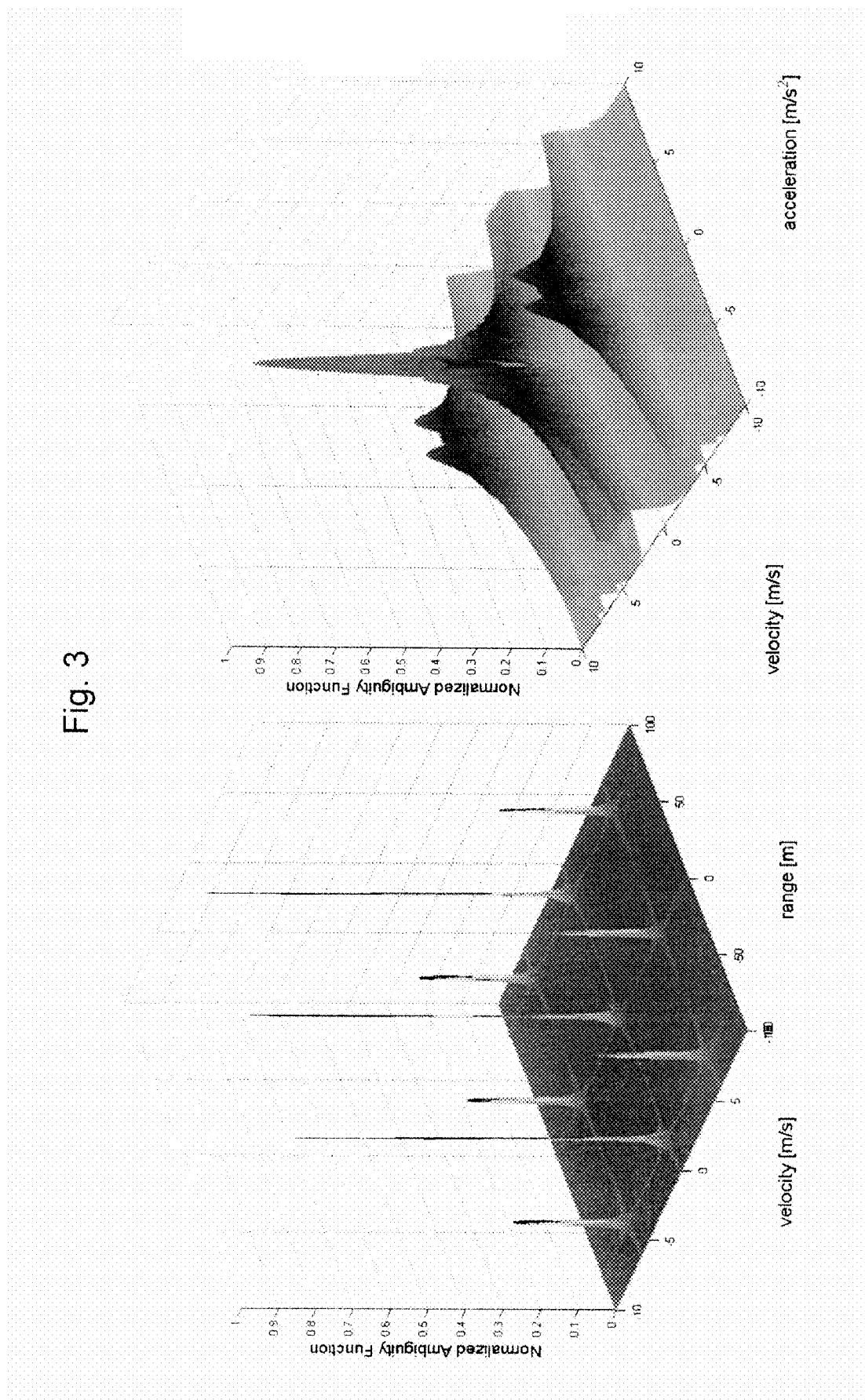
FIG. 3 is the same ambiguity function as in FIG. 2 shown at a wider scale.

The parameters above appear in a form that is invariant under translation. For analysis, it can therefore be assumed that all the target motion parameters are zero. In this case, the corresponding ambiguity function Ψ is given by:

$$\Psi(\tau, v, \alpha) = \left|\sum_{k=-K}^{K}\sum_{n=-N}^{N} e^{j2\pi(f_{RF}+k\Delta f)\hat{\tau}_n(\tau,v,\alpha)}\right|, \qquad (17)$$

with a maximum value at the origin. FIG. 2 shows the range-velocity and velocity-acceleration projections of the 3D ambiguity function Ψ. FIG. 3 shows the corresponding global ambiguity functions Ψ for range-velocity and velocity-acceleration projections. As seen in FIG. 3, the range-velocity ambiguities resemble a bed of spikes.

Characteristics of the ambiguity function Ψ, namely, convexity and mainlobe width near the origin, are important for the design of an MLE that is based on a coarse search and a fine search. That is, the coarse search relies on these characteristics of the ambiguity function to set up a coarse sampling grid that enables the convergence of recursive algorithms (e.g., in one embodiment, the Newton method, discussed in more detail below) used for the fine search. In this embodiment, the interval of convergence of the Newton method is obtained by solving the limit cycle equation associated with each motion parameter. The limit cycle equation is solved for each motion parameter separately when the other two are set to zero. In the absence of noise, the interval of convergence for the range, radial velocity, and acceleration is given by:

$$\begin{pmatrix} \pm\frac{1.51}{\pi}\frac{c}{2}\frac{1}{(2K+1)\Delta f}, \pm\frac{1.51}{\pi}\frac{\lambda}{2}\frac{1}{(2N+1)IPP}, \\ \pm 0.000249\lambda\left(\frac{81}{(2N+1)IPP}\right)^2 \end{pmatrix}. \qquad (18)$$

In conditions of high noise it may be necessary to shrink the above estimates by 25-50% in order to assure convergence of the recursive fine search algorithm.

Many previous implementations of the MLE have generally been confined to the likelihood function simplification and calculation of a priori bounds on the mean square error for the MLE of range, velocity, and acceleration. Other efforts have used an approach based on the Hough Transform (HT) to obtain an estimate of the motion parameters for initializing the MLE algorithm. However, the HT is inherently non-coherent and easily breaks down in medium to low signal-to-noise (SNR) conditions.

Figure 4:
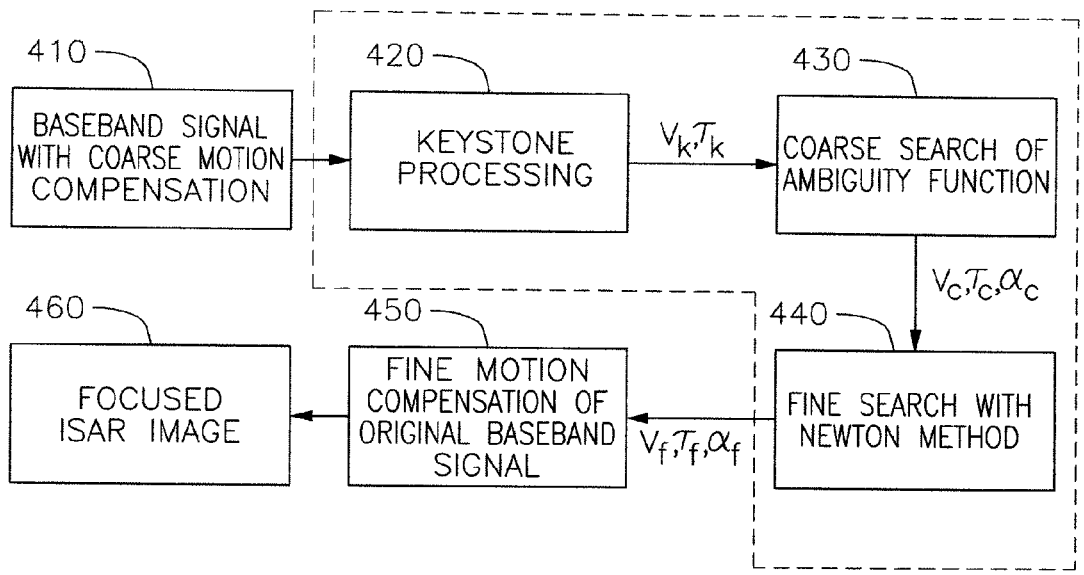
FIG. 4 is a flow chart illustrating a process according to an exemplary embodiment of the present invention.

Thus, according to an exemplary embodiment of the present invention, a fully coherent MLE algorithm us utilized, which is resilient in a medium to low SNR environment. The MLE algorithm of this embodiment has three stages, as illustrated in FIG. 4: i) using Keystone Formatting in block 420 to obtain estimates of target range and radial velocity; ii) using Keystone estimates of range and radial velocity to initialize a coarse search over parameter space for range, radial velocity, and acceleration in block 430; and iii) carrying out a fine search over parameter space with the Newton method in block 440. Blocks 410, 450, and 460 are utilized in further embodiments, as discussed below.

An ideal MLE algorithm might consist solely of a coarse search over parameter space followed by a fine search. In this case, the coarse search would be designed to sample parameter space with enough granularity to pick out the mainlobe of the correlation. According to aspects of the present invention, the grid spacing of the coarse search should also be tailored to ensure the convergence of the fine search algorithm, which follows the coarse search. That is, the result of the coarse search should be close enough to the peak of the mainlobe, or within the interval of convergence of the fine search. To this end, the grid spacing shown in Equation (18) is proportional to the mainlobe width, i.e. c/(2BW) for range and $(\lambda/2)/T_{DWELL}$ for velocity. Because of the small area, c/(2BW) by $(\lambda/2)/T_{DWELL}$ of the mainlobe, and the abundance of local optima (as illustrated in FIG. 3), searching for the global maximum of the correlation typically requires an exceedingly large number of computations. Thus, it is desired to reduce the size of the coarse search window to make the number of computations more manageable.

Recall that the MLE algorithm assumes the presence of at least one dominant scatterer in the radar data. A ballpark estimate of the range and radial velocity of the target can be obtained by scrutinizing the strongest scatterer in a range-doppler map formed from the radar data. Normally, range migration (caused by uncompensated target velocity) would render such a procedure of little practical use because the resulting image would be substantially distorted.

Thus, according to an exemplary embodiment of the invention, the range migration caused by uncompensated target velocity can be reduced or eliminated by employing Keystone Formatting, a technique known to those skilled in the art, which includes variable frequency resampling of the cross-range compressed radar data such that:

$$f_d' = \left(\frac{f_{RF} + k\Delta f}{f_{RF} + K\Delta f}\right) f_d, \quad (19)$$

where $f_d$ is the doppler frequency. For more information on Keystone Formatting, see Perry, R. P., et al, "SAR Imaging of Moving Target," IEEE TRANS. AES, January 1999, pp. 188-200, the disclosure of which is incorporated herein by reference. Although the subject of this paper is synthetic aperture radar, the Keystone processing technique described therein is broadly applicable to any coherent radar.

Figure 5:
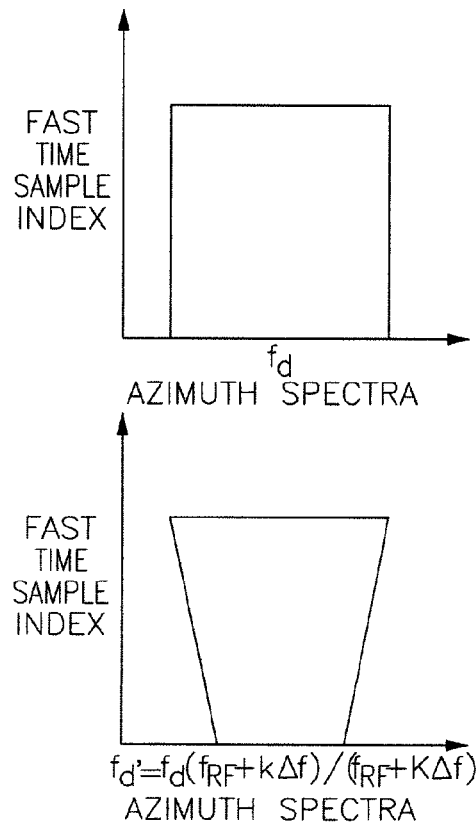
FIG. 5 is a chart illustrating Keystone Formatting as implemented by an exemplary embodiment of the present invention.

The Keystone Formatting operation above is essentially a one-dimensional interpolation of the Fourier-transformed (in slow-time) radar data, as illustrated in FIG. 5. It should be noted that the Keystone mapping parameters are independent of the unknown target motion, depending only on the known radar sensor parameters.

Keystone Formatting substantially removes the linear range migration, which is the dominant blurring mechanism that must be compensated for in order to obtain a high resolution range-doppler map of the moving target. After Keystone Formatting, the range and radial velocity of the strongest scatterer in the Keystoned range-doppler map can be extracted by determining the maximum of the range-doppler map, and used as a first estimate of those target motion parameters to initialize the coarse search over parameter space. As noted earlier, the HT has previously been used, but had limited success due to its non-coherent nature. According to the exemplary embodiment disclosed herein, MLE initialization via Keystone Formatting is fully coherent and yields ballpark first estimates of target range and radial velocity in lower SNR conditions than the HT procedure.

The coarse search includes sampling Equation (15) over parameter space. Thus, in the exemplary embodiment, for each motion parameter $\hat{\tau}$, $\hat{v}$, and $\hat{\alpha}$, the search window over which the coarse search is performed is proportional to the expected error of the input parameters used to initialize the coarse search. In the case of range and velocity, these are determined by the values extracted from the Keystoned range-doppler map. The error associated with the target range is relatively small, so the range window size is made to be proportional to several times the range grid size specified in Equation (18).

After Keystone formatting, the dominant mechanism that distorts the focus of the range-doppler map is uncompensated target acceleration, which introduces a quadratic phase term along the slow-time axis, defocusing the image in doppler. The window size should therefore be enlarged to accommodate the distortion in doppler due to uncompensated acceleration. When constructing the search window for acceleration, it is assumed that the target's acceleration is in the vicinity of zero. The acceleration window size is then made to be several times the acceleration grid spacing specified in Equation (18).

The coarse search performed in block 430 places the MLE in the vicinity of the mainlobe of the correlation. At this stage a number of techniques have been employed to search for the precise point of the maximum of the correlation. Some advantages of the Newton method are its accuracy and its speed of convergence, which is usually quadratic but becomes cubic when the objective function to be optimized is symmetric. When the Newton method is applied for the Fine Search in block 440 to find the maximum of the correlation, it produces the recurrence:

$$\begin{pmatrix} \tau_{k+1} \\ v_{k+1} \\ \alpha_{k+1} \end{pmatrix} = \begin{pmatrix} \tau_k \\ v_k \\ \alpha_k \end{pmatrix} - [\Psi^{(2)}(\tau_k, v_k, \alpha_k)]^{-1} \Psi^{(1)}(\tau_k, v_k, \alpha_k), \quad (20)$$

where $k=1, 2, \ldots$, is the iteration step, $\Psi^{(1)}$ is the gradient of $\Psi$, and $\Psi^{(2)}$ is the Hessian of $\Psi$, i.e., the matrix of mixed second partial derivatives. In this embodiment, the recurrence of Equation (20) is repeated until the Cramer-Rao bound (CRB) is reached for each of the target motion parameters, i.e., while the condition $\Delta\tau = \tau_{k+1} - \tau_k \leq \tau_{CRB}$ is true. The CRB gives the lower bound in variance for an unbiased estimator of a deterministic parameter, which provides a measure for assessing the performance of different estimators. The CRB is computed in closed form for each of the target motion parameters.

In the exemplary embodiment disclosed herein, the computational load of the MLE algorithm is dominated by the coarse search over parameter space. That is, algorithm initialization with Keystone formatting and the fine search with the Newton method are comprised of substantially fewer computations. The number of floating point operations (FLOPs) of the coarse search is given by:

$$N_{FLOP} \approx 64(2K+1)(2N+1)\left(\frac{\Delta r}{\delta r}\right)\left(\frac{\Delta v}{\delta v}\right)\left(\frac{\Delta \alpha}{\delta \alpha}\right), \quad (21)$$

where K=(BW/Δf−1)/2, N=($T_{DWELL}$/IPP−1)/2, and Δr, Δv, Δα, are the range, velocity, and acceleration window sizes, and δr, δv, δα, are the range, velocity, and acceleration lattice spacings given by Equation (18). For a radar with BW=500 MHz, $T_{DWELL}$=0.5 s, Δf=3.75 s, and IPP=0.005 s, the FLOP count for the MLE algorithm is roughly 1 megaFLOP per element, where the number of elements is given by:

$$N_{elements} = \left(\frac{\Delta r}{\delta r}\right)\left(\frac{\Delta v}{\delta v}\right)\left(\frac{\Delta \alpha}{\delta \alpha}\right). \quad (22)$$

In a further embodiment, "chipping" is utilized after Keystone Formatting, in which a two dimensional bandpass filter is used after detection to reduce the computational load. With chipping, a particular target of interest is extracted from the part of the image that contains the target of interest, followed by further processing and downsampling of the extracted portion of the image. Reducing the number of fast-time samples, 2K+1, by a factor of 14 and the number of slow-time samples, 2N+1, by a factor of 3 reduces the computational load to roughly 200 kiloFLOPs per element. The numbers quoted above correspond to a scenario with a target accelerating at 1 m/s² in conditions of low SNR. In some embodiments for less drastic scenarios, a higher level of chipping is used to reduce the computational load even further.

The MLE algorithm according to various embodiments of the present invention is not as computationally intensive as other efforts, and thus is more conducive to radar system implementation. Furthermore, the inclusion of algorithm initialization with Keystone formatting greatly reduces the computational load of the MLE. It should be noted that the FLOP count given by Equation (21) was determined for a MATLAB implementation of the MLE algorithm. The computational load is expected to improve as code implementation is carried out in a more efficient language (e.g., C, FORTRAN) and the algorithm itself is optimized.

To further illustrate the present invention, the algorithm described above is applied to motion compensation of ISAR imagery. In describing this embodiment, the application of the further blocks of FIG. 4 will become apparent.

A typical moving target can be modeled as a collection of point scatterers each moving with a slightly different trajectory. Each scatterer's motion deviates from the average motion of all scatterers due to their relative rotation with respect to the center of cross section and other motion perturbations such as structural vibration effects, target motion irregularities, etc. The radial motion (i.e., motion along the line of sight) of the dominant scatterers essentially defines the average observed relative velocity between the radar and the target. An optimal motion compensation technique should at least remove the effects of this average target motion. The fine motion compensation approach of this embodiment, illustrated in block 450 of FIG. 4, is based on the MLE of range, radial velocity, and acceleration of the target dominant scatterer that are output by block 440. The fine motion compensated radar return $W_{k,n}$ is then given by:

$$W_{k,n}(\hat{\tau}, \hat{v}, \hat{\alpha}) = \hat{Y}_{k,n} e^{j2\pi f_{RF} \tau_n(\hat{\tau}, \hat{v}, \hat{\alpha})} \times e^{j2\pi k \Delta f \tau_n(\hat{\tau}, \hat{v}, \hat{\alpha})}, \quad (23)$$

where $\hat{\tau}$, $\hat{v}$, and $\hat{\alpha}$ represent the maximum likelihood estimates for the target motion parameters.

Figure 6:
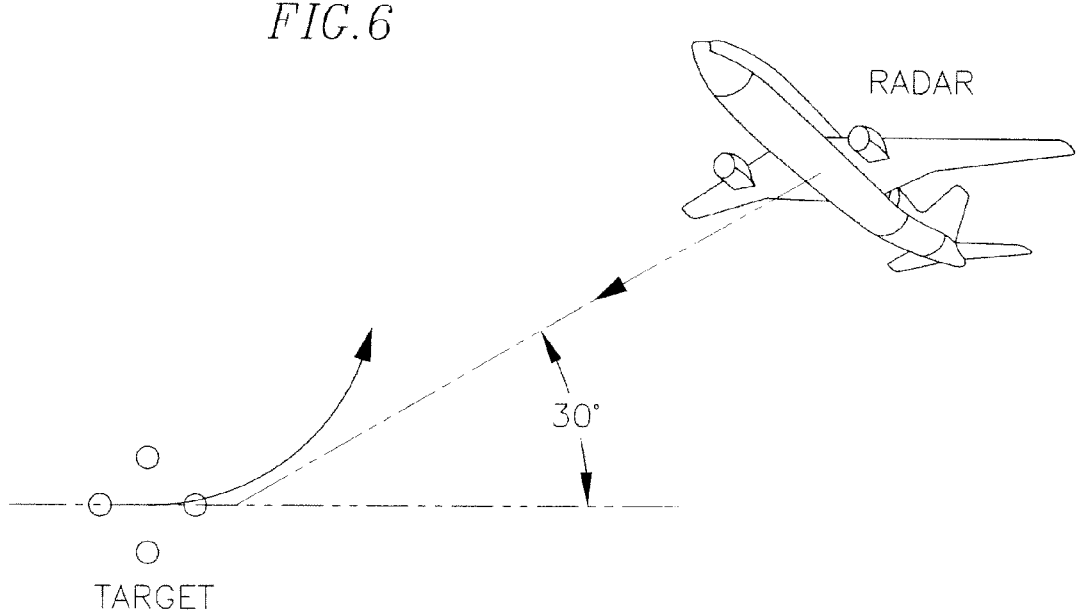
FIG. 6 is a diagram of a simulated maneuvering target for which motion parameters were determined by utilizing a process according to an exemplary embodiment of the present invention.

To demonstrate the effectiveness of the MLE algorithm in focusing an ISAR image, a simulated scenario was examined in which an airborne radar probed a flying maneuvering target. The scenario is illustrated in FIG. 6. For this simulation, the radar operated at a frequency of 10 GHz (X-band), with a bandwidth of 300 MHz, an IPP of 0.0025 s, while probing the target for 0.3 s. The target moved at 250 m/s and was composed of four point scatterers arranged in a cross pattern, with each scatterer placed 7.5 m from the center of mass of the target. The radar also moved at 250 m/s, but there was a 30 degree separation between the velocity vector of the target and that of the radar. The target and radar were placed 10 km apart. During the duration of the dwell, the target performed a 1 g maneuver away from the horizontal. Over the duration of the dwell, the change in aspect angle was 0.89 degrees. The simulation was carried out with an integrated signal-to-noise ratio ($SNR_{int}$) of 30 dB. The $SNR_{int}$ is defined as:

$$SNR_{int} = \frac{A_0^2}{\sigma^2}(2K+1)(2N+1), \quad (24)$$

where $A_0$ is the amplitude of the complex scattering coefficient and $\sigma^2$ is the variance of the noise.

The top panel of FIG. 7 shows an ISAR image of the simulated target with only coarse, tracker-based motion compensation. The bottom panel of FIG. 7 shows the corresponding ISAR image after fine, MLE-based motion compensation according to an exemplary embodiment of the present invention. The image is substantially sharpened after fine motion compensation, with a 5.5 dB improvement in the signal power relative to the unfocused signal power. In various embodiments, this level of improvement can be achieved regardless of tactical scenario. The radial acceleration that must be estimated by the MLE can be induced by the geometry of the radar-target system, or it can be induced by a combination of geometry and target maneuvering.

Further, a series of Monte Carlo simulations were carried out to characterize the performance of one embodiment of the MLE algorithm. A performance comparison was made between this embodiment of the MLE algorithm and the phase difference auto-focus (PDAF) technique. The PDAF technique obtains the quadratic phase error estimate from the Fourier transform of a phase difference function created from subaperture data. PDAF requires a small number of computations but only makes suboptimal use of only half of the dwell data and is vulnerable to range migration due to uncompensated target velocity and acceleration.

The simulations consisted of a point target and a radar. The radar operated at a frequency of 10 GHz (X-band), with a bandwidth of 500 MHz, a frequency step of 3.75 MHz, and an IPP of 0.005 s, while probing the target for 0.5 s. The target and radar both moved with a tangential velocity of 250 m/s and were separated by 10 km. There was a 30 degree separation between the velocity vector of the target and that of the radar. During the duration of the dwell, the target performed a 1 g maneuver away from the horizontal. The target's acceleration was assumed not to be accounted for during coarse motion compensation. The MLE and PDAF focusing algorithms therefore corrected for ~1.8 m/s² of acceleration. The performance of each algorithm was characterized as a function of the integrated SNR. One hundred Monte Carlo trials per $SNR_{int}$ were used to compute the root mean square error (RMSE) of the acceleration estimate from each algorithm.

Figure 8:
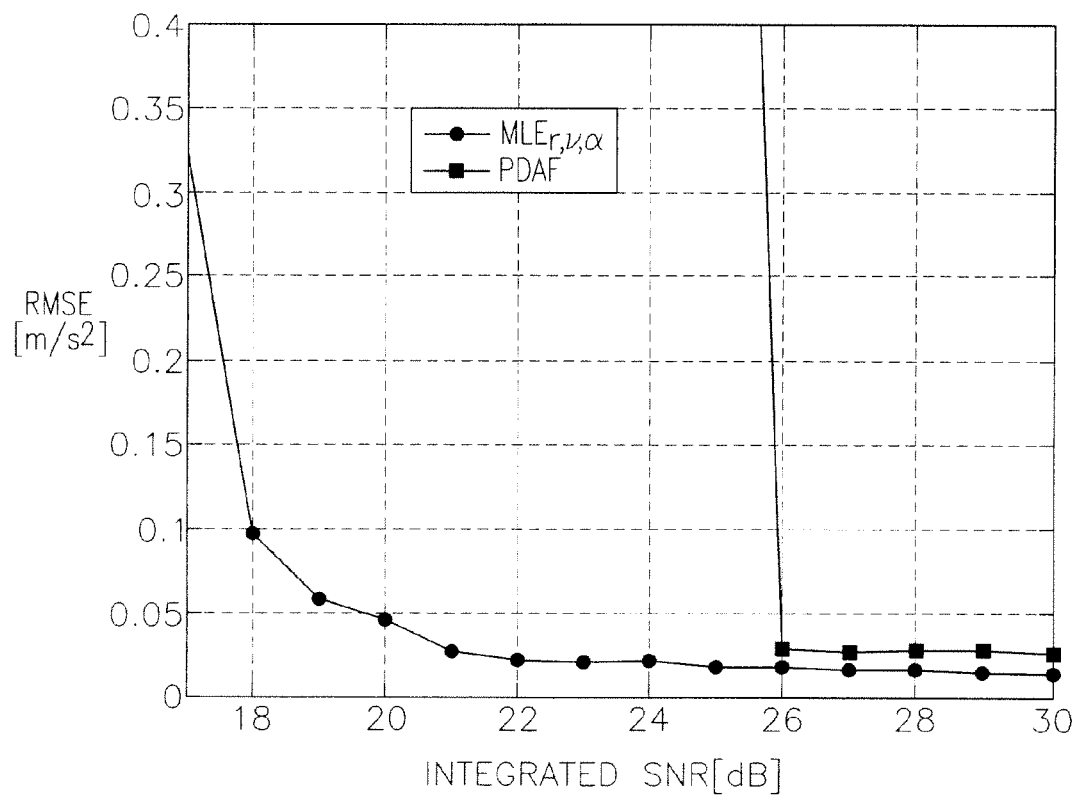
FIG. 8 is a chart illustrating an improvement in root mean square errors as a function of the signal-to-noise ratio, achieved by an exemplary embodiment of the present invention in comparison to that achieved by a PDAF algorithm.

The RMSE of the MLE (according to an exemplary embodiment of the present invention) and PDAF algorithms are shown in FIG. 8 for different levels of integrated SNRs. The PDAF algorithm breaks down at an $SNR_{int}$ of 25 dB, whereas the MLE according to the embodiment breaks down at an $SNR_{int}$ of 17 dB. In the region of high $SNR_{int}$ (25-30 dB), the MLE according to the embodiment outperforms PDAF by about 5 dB, i.e., PDAF requires at least 5 dB higher $SNR_{int}$ to achieve the same level of accuracy. The MLE according to the embodiment outperforms PDAF because the latter uses only half of the slow-time samples taken in the dwell. Also, at lower $SNR_{int}$, the multiplicative noise becomes substantial when applying PDAF. The MLE algorithm according to the embodiment begins to break down around 17 dB because the initial estimates given by the Keystone processing are outside the region of convergence for the coarse and fine search components of the algorithm. Although Keystone processing is fully coherent and more resilient than the HT, the signal is eventually overwhelmed by the noise and the true location of the point scatterer in the Keystoned range-doppler map becomes ambiguous. The coarse search and fine search components of the MLE algorithm have a much lower threshold $SNR_{int}$. The true limit of performance of the MLE algorithm according to various embodiments of the present invention can only be tested if it is provided with a priori knowledge of the target motion parameters or if the size of the coarse search is exceedingly large. From a practical standpoint, the size of the coarse search would be too large for real-time implementation if no a priori knowledge was a available to constrain the search area.

While the present invention has been described in connection with certain exemplary embodiments, it is to be understood that the invention is not limited to the disclosed embodiments, but, on the contrary, is intended to cover various modifications and equivalent arrangements included within the spirit and scope of the appended claims, and equivalents thereof.

What is claimed is:

1. A method for determining a maximum likelihood estimate (MLE) of motion parameters of a target from a return signal from a pulse doppler radar, comprising:
   keystone processing a baseband signal;
   generating a first estimate of the motion parameters;
   utilizing the first estimate to perform a coarse search of an ambiguity function Ψ to determine a second estimate of the motion parameters corresponding to global maxima of samples of Ψ at predetermined sampling intervals; and
   performing a fine search by applying Newton's method to Ψ to find the MLE, utilizing the second estimate of the motion parameters as an initial condition.

2. The method of claim 1, further comprising
   transmitting a linear frequency modulated radar pulse train toward the target; and
   receiving and preprocessing the return signal reflected from the target to obtain the baseband signal.

3. The method of claim 2, wherein the ambiguity function Ψ has three dimensions, such that the motion parameters comprise a range r, a range rate v, and an acceleration a of the target, wherein the range r is proportional to a round trip delay τ between the transmitting and the receiving.

4. The method of claim 3, wherein keystone processing the baseband signal comprises translating the doppler frequency of the baseband signal into a keystone-processed signal based on the equation:

$$f'_d = \left(\frac{f_{RF} + k\Delta f}{f_{RF} + K\Delta f}\right) f_d$$

where $f_d$ is a doppler frequency, $f_{RF}$ is a carrier frequency of a transmitted waveform, $\Delta f$ is a frequency step, k is a range frequency index, and $f'_d$ is a translated doppler frequency.

5. The method of claim 4, wherein the first estimate of the motion parameters comprises a first range estimate and a first range rate estimate, and wherein the first estimate is extracted from the keystone-processed signal.

6. The method of claim 5, wherein the ambiguity function Ψ comprises a correlation function between a real phase of the return signal and a model phase.

7. The method of claim 6, wherein the coarse search comprises:
   setting up a coarse sampling grid for sampling the ambiguity function Ψ in parameter space; and
   sampling Ψ over the coarse sampling grid.

8. The method of claim 7, wherein the predetermined sampling intervals are a grid spacing of the coarse sampling grid, and wherein the grid spacing is proportional to a mainlobe width of the ambiguity function Ψ in each of its three dimensions.

9. The method of claim 8, wherein the grid spacing in parameter space is given by the equation:

$$(\tau, v, \alpha) = \zeta \begin{pmatrix} \pm \frac{1.51}{\pi} \frac{c}{2} \frac{1}{(2K+1)\Delta f}, \\ \pm \frac{1.51}{\pi} \frac{\lambda}{2} \frac{1}{(2N+1)IPP}, \\ \pm 0.000249 \lambda \left(\frac{81}{(2N+1)IPP}\right)^2 \end{pmatrix},$$

wherein c is the speed of light in a vacuum; λ is a wavelength of the return signal; K is an integer such that $(2K+1)\Delta f$ is a bandwidth of the transmitted waveform; N is an integer and IPP is an inter-pulse period such that $(2N+1)IPP$ is a dwell duration; and ζ is a constant for scaling the grid spacing.

10. The method of claim 9, wherein ζ is approximately in the range of $0.5 \leq \zeta \leq 0.75$.

11. The method of claim 9, wherein the fine search comprises repeating a recurrence of $$\begin{pmatrix} \tau_{k+1} \\ v_{k+1} \\ \alpha_{k+1} \end{pmatrix} = \begin{pmatrix} \tau_k \\ v_k \\ \alpha_k \end{pmatrix} - [\Psi^{(2)}(\tau_k, v_k, \alpha_k)]^{-1} \Psi^{(1)}(\tau_k, v_k, \alpha_k)$$

starting at the coarse search selected grid point until a Cramer-Rao bound (CRB) is reached for each of the target motion parameters, where $\Psi^{(1)}$ is a gradient of Ψ, and $\Psi^{(2)}$ is a Hessian of Ψ.

12. The method of claim 1, wherein the recurrence is repeated while $\Delta\tau=\tau_{k+1}-\tau_k \leqq \tau_{CRB}$ is true; or while $\Delta v = v_{k+1} - v_k \leqq v_{CRB}$ is true; or while $\Delta\alpha = \alpha_{k+1} - \alpha_k \leqq \alpha_{CRB}$ is true.

13. The method of claim 12, further comprising performing fine motion compensation, wherein $$W_{k,n}(\tau,v,\alpha) = \hat{Y}_{k,n} e^{j2\pi f_{RF}\tau_n(\tau,v,\alpha)} \times e^{j2\pi k \Delta f \tau_n(\tau,v,\alpha)},$$

where $W_{k,n}$ is a fine motion compensated radar return, and $\hat{Y}_{k,n}$ is a frequency-domain representation of the baseband signal.

* * * * *